(12) United States Patent
Schick et al.

(10) Patent No.: US 10,000,588 B2
(45) Date of Patent: Jun. 19, 2018

(54) COATING FOR THE INNER SURFACE OF PLASTIC BOTTLES FOR PROTECTION AGAINST DEGRADATION FROM VOLATILE ORGANIC COMPOUNDS

(75) Inventors: Martin Frederick Schick, Kingsport, TN (US); Amy Lee Bolton, Chuckey, TN (US); Jayme Leita, Johnson City, TN (US); Alisa Annette Williams, Fall Branch, TN (US); Gary Michael Stack, Kingsport, TN (US); Scott Ellery George, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 291 days.

(21) Appl. No.: 13/548,471

(22) Filed: Jul. 13, 2012

(65) Prior Publication Data
US 2013/0029167 A1  Jan. 31, 2013

Related U.S. Application Data

(60) Provisional application No. 61/512,589, filed on Jul. 28, 2011.

(51) Int. Cl.
| | |
|---|---|
| *C09D 5/00* | (2006.01) |
| *C09D 133/04* | (2006.01) |
| *C09D 133/06* | (2006.01) |
| *C09D 147/00* | (2006.01) |
| *C08L 33/04* | (2006.01) |
| *C08L 33/06* | (2006.01) |
| *C08L 47/00* | (2006.01) |
| *C08L 67/02* | (2006.01) |
| *C08L 67/03* | (2006.01) |
| *C08K 5/00* | (2006.01) |
| *C08K 5/07* | (2006.01) |
| *C08K 5/10* | (2006.01) |
| *C08K 5/132* | (2006.01) |
| *C08K 5/50* | (2006.01) |
| *C08K 5/5397* | (2006.01) |
| *C08J 7/04* | (2006.01) |
| *C08G 63/12* | (2006.01) |
| *C08G 63/16* | (2006.01) |
| *C08G 63/183* | (2006.01) |
| *C08G 63/199* | (2006.01) |
| *B32B 27/08* | (2006.01) |
| *B32B 27/30* | (2006.01) |
| *B32B 27/36* | (2006.01) |
| *C08F 20/10* | (2006.01) |
| *C09D 4/00* | (2006.01) |

(52) U.S. Cl.
CPC .............. *C08F 20/10* (2013.01); *C09D 4/00* (2013.01); *B32B 27/08* (2013.01); *B32B 27/308* (2013.01); *B32B 27/36* (2013.01); *B32B 2255/10* (2013.01); *B32B 2255/26* (2013.01); *B32B 2307/40* (2013.01); *B32B 2333/04* (2013.01); *B32B 2367/00* (2013.01); *C08G 63/12* (2013.01); *C08G 63/16* (2013.01); *C08G 63/183* (2013.01); *C08G 63/199* (2013.01); *C08J 7/04* (2013.01); *C08J 2333/04* (2013.01); *C08J 2333/06* (2013.01); *C08J 2347/00* (2013.01); *C08K 5/00* (2013.01); *C08K 5/0025* (2013.01); *C08K 5/07* (2013.01); *C08K 5/10* (2013.01); *C08K 5/132* (2013.01); *C08K 5/50* (2013.01); *C08K 5/5397* (2013.01); *C08L 33/04* (2013.01); *C08L 33/06* (2013.01); *C08L 47/00* (2013.01); *C08L 67/02* (2013.01); *C08L 67/03* (2013.01); *C09D 5/00* (2013.01); *C09D 133/04* (2013.01); *C09D 133/06* (2013.01); *C09D 147/00* (2013.01); *Y10T 428/31786* (2015.04); *Y10T 428/31797* (2015.04)

(58) Field of Classification Search
None
See application file for complete search history.

(56) References Cited

U.S. PATENT DOCUMENTS

| | | | |
|---|---|---|---|
| 3,030,335 A | 4/1962 | Goldberg | |
| 3,317,466 A | 5/1967 | Caldwell et al. | |
| 3,321,510 A | 5/1967 | Lotz et al. | |
| 3,772,405 A | 11/1973 | Hamb | |
| 3,776,945 A | 12/1973 | Ligorati et al. | |
| 3,907,868 A * | 9/1975 | Currie et al. | 560/98 |
| 4,286,083 A | 8/1981 | Kochanowski | |
| 4,474,999 A | 10/1984 | Mark et al. | |
| 4,537,667 A * | 8/1985 | Bishop et al. | 522/1 |
| 4,576,850 A * | 3/1986 | Martens | 428/156 |
| 4,833,038 A * | 5/1989 | Poole et al. | 428/457 |

(Continued)

FOREIGN PATENT DOCUMENTS

| | | |
|---|---|---|
| EP | 0 337 695 A2 | 10/1989 |
| FR | 2851940 A1 | 9/2004 |

(Continued)

OTHER PUBLICATIONS

ASTM E308

(Continued)

*Primary Examiner* — Vivian Chen
(74) *Attorney, Agent, or Firm* — Tammye L. Taylor

(57) ABSTRACT

The present invention relates to coatings for a polymer, the coating comprising a diacrylate of an aliphatic diol, a polyacrylate of an aliphatic polyol, a photoinitiator, wherein the average molecular weight between cross-links in the coating is less than 190 g/mol. The invention further relates to articles comprising the coating and a polymer.

7 Claims, No Drawings

(56) References Cited

U.S. PATENT DOCUMENTS

| | | |
|---|---|---|
| 4,902,725 A | 2/1990 | Moore |
| 5,051,528 A | 9/1991 | Naujokas et al. |
| 5,262,511 A | 11/1993 | Caringi et al. |
| 5,298,530 A | 3/1994 | Gamble et al. |
| 5,484,824 A * | 1/1996 | Abe ................. C08L 53/00 523/436 |
| 5,489,665 A | 2/1996 | Yamato et al. |
| 5,494,992 A | 2/1996 | Kanno et al. |
| 5,498,688 A | 3/1996 | Oshino et al. |
| 5,498,749 A | 3/1996 | Heise et al. |
| 5,576,456 A | 11/1996 | Gamble et al. |
| 5,654,347 A | 8/1997 | Khemani et al. |
| 5,696,176 A | 12/1997 | Khemani et al. |
| 6,022,941 A | 2/2000 | Mestanza et al. |
| 6,160,082 A | 12/2000 | Lin et al. |
| 6,262,294 B1 | 7/2001 | Sako et al. |
| 6,472,557 B1 * | 10/2002 | Pell et al. ............. 562/483 |
| 6,706,843 B1 | 3/2004 | Ishihara et al. |
| 7,224,529 B2 * | 5/2007 | King et al. ............ 359/619 |
| 7,361,409 B2 * | 4/2008 | Sugimoto et al. ........ 428/500 |
| 7,375,144 B2 * | 5/2008 | Gilmer ................ 522/92 |
| 7,444,932 B2 * | 11/2008 | Strand et al. .......... 101/23 |
| 7,462,649 B2 | 12/2008 | Nakao et al. |
| 7,553,879 B2 * | 6/2009 | Laginess et al. ........ 522/2 |
| 2001/0034379 A1 * | 10/2001 | Valet ................. C08G 18/62 522/33 |
| 2002/0081391 A1 * | 6/2002 | Baumbach .......... C08G 18/6705 427/508 |
| 2003/0077394 A1 * | 4/2003 | Bradford ............ B05D 3/0209 427/407.1 |
| 2003/0113520 A1 * | 6/2003 | Takahashi ........... B32B 37/144 428/201 |
| 2004/0116572 A1 * | 6/2004 | Cartier et al. ......... 524/404 |
| 2005/0004390 A1 * | 1/2005 | Nakao et al. .......... 560/89 |
| 2005/0165125 A1 * | 7/2005 | Tsunoda et al. ........ 522/1 |
| 2005/0245631 A1 * | 11/2005 | Gould et al. .......... 522/71 |
| 2006/0058458 A1 | 3/2006 | Hasskerl et al. |
| 2006/0094858 A1 * | 5/2006 | Turner et al. ......... 528/272 |
| 2006/0258765 A1 * | 11/2006 | Ramsey ............... C09D 4/00 522/71 |
| 2008/0161468 A1 * | 7/2008 | Juikar ................ C08F 14/18 524/423 |
| 2009/0017256 A1 * | 1/2009 | Hunt et al. ............ 428/141 |
| 2009/0311452 A1 | 12/2009 | Gourde et al. |
| 2010/0173115 A1 | 7/2010 | Isonaka et al. |

FOREIGN PATENT DOCUMENTS

| | | |
|---|---|---|
| FR | 2889485 A1 | 2/2007 |
| JP | 02-123172 A | 5/1990 |
| JP | 03-172358 A | 7/1991 |
| JP | 05-295296 A | 11/1993 |
| JP | 2007-090657 A | 4/2007 |
| JP | 2009/203310 A | 9/2009 |
| JP | 2009-215537 A | 9/2009 |
| JP | 2010-260954 A | 11/2010 |

OTHER PUBLICATIONS

ASTM D1003.
Notification of Transmittal of the International Search Report and the Written Opinion of the International Searching Authority dated Sep. 25, 2012, International Application No. PCT/US2012/047130.
SR399; "Dipentaerythritol Pentaacrylate"; Sartomer Product Selection Guide, Mar. 15, 2011.
SR295; "Pentaerythritol Tetraacrylate"; Sartomer Product Selection Guide, Mar. 15, 2011.
SR238B; "1,6 Hexanediol Diacrylate"; Sartomer Product Selection Guide, Mar. 15, 2011.
SR833 S; "Tricyclodecane Dimethanol Diacrylate"; Sartomer Product Selection Guide, Mar. 15, 2011.
SR444; "Pentaerythritol Triacrylate"; Sartomer Product Selection Guide, Mar. 15, 2011.
SR508; "Dipropylene Glycol Diacrylate"; Sartomer Product Selection Guide, Mar. 15, 2011.

* cited by examiner

COATING FOR THE INNER SURFACE OF PLASTIC BOTTLES FOR PROTECTION AGAINST DEGRADATION FROM VOLATILE ORGANIC COMPOUNDS

CROSS REFERENCE TO RELATED APPLICATIONS

This application claims benefit of the provisional application U.S. Ser. No. 61/512,589, filed Jul. 28, 2011.

FIELD OF THE INVENTION

This invention relates to coatings to protect plastic containers from degradation caused by the contents of the plastic containers. More specifically, this invention relates to coatings to protect plastic containers from degradation caused by carriers and essential oils in fragrance compositions and containers using the coatings.

BACKGROUND OF THE INVENTION

There is a need in the Cosmetics and Personal Care market for plastic fragrance bottles. Globally, the fragrance container market stands at 1.2 billion units. Plastic containers are safer than glass, more durable in transit and lighter in weight. Also, plastic containers are less expensive to color or decorate than glass and offer greater design freedom than glass. However, polymers have been used only in a few specific fragrance containers or in areas, such as caps and nozzles, which are either opaque or not exposed directly to the perfume. Because many polymers, such as copolyesters, are amorphous in nature, they are degraded by the various carriers and essential oils found in fragrances resulting in plasticization, stress cracking, spotting or hazing. Thus, it is of interest to develop a coating for molded bottles which would protect the plastic surface from these chemicals. Premium perfumes generally consist of a combination of up to 33 weight % of various essential oils and fragrances in ethanol. There exists a need for coatings that produces a protective finish for a thermoplastic substrate exposed to fragrances or other material with similar volatile components.

Plastic sheets and films are well adapted to curing surface coatings using UV light where ambient temperatures and rapid reaction kinetics allow for low color coatings without distortion of the plastic. Conversely, the irregular shapes and narrow mouth openings of fragrance containers present a substantial challenge to coating the inside surface due in part to the difficulty of curing through the plastic. There exists a need for, and the present invention provides, a variety of formulated curing options to enable crosslinking of acrylates by indirect exposure to UV light, optionally in combination with thermal treatment.

BRIEF SUMMARY OF THE INVENTION

In one aspect, the invention comprises a coating for a polymer, the coating comprising: a) a diacrylate of an aliphatic diol; b) a polyacrylate of an aliphatic polyol; and c) a photoinitiator, wherein the average molecular weight between cross-links is less than about 190 g/mol.

In one aspect, the invention comprises a coating for a polymer, the coating comprising: a) a diacrylate of an aliphatic diol; b) a polyacrylate of an aliphatic polyol; c) a photoinitiator; and d) optionally, a thermal free-radical initiator, wherein the average molecular weight between cross-links is less than about 190 g/mol.

In one aspect, the invention comprises a coating for a polymer, the coating comprising: a) a diacrylate of an aliphatic diol; b) a triacrylate of an aliphatic triol; and c) a photoinitiator, wherein the average molecular weight between cross-links is less than about 190 g/mol.

In one aspect, the invention comprises a coating wherein the coating comprises about 30 to about 70 weight % of a diacrylate of an aliphatic diol; about 30 to 70 weight % of a polyacrylate of an aliphatic polyol; and about 0.5 to 10 weight % of a photoinitiator, wherein the weight % is based on the total weight of the coating.

In one aspect, the invention comprises a coating wherein the coating comprises about 30 to about 70 weight % of a diacrylate of an aliphatic diol; about 30 to 70 weight % of a triacrylate of an aliphatic triol; and about 0.5 to 10 weight % of a photoinitiator, wherein the weight % is based on the total weight of the coating.

In one aspect, the invention comprises a coating wherein the coating comprises about 90 to about 99.5 weight % of a triacrylate of an aliphatic triol; and about 0.5 to 10 weight % of a photoinitiator, wherein the weight % is based on the total weight of the coating.

In one aspect, the invention comprises a coating wherein the coating comprises about 90 to about 99.5 weight % of a polyacrylate of an aliphatic polyol; and about 0.5 to 10 weight % of a photoinitiator, wherein the weight % is based on the total weight of the coating.

In one aspect, the invention comprises a coating comprising about 30 to about 70 weight % of a diacrylate of an aliphatic diol, about 30 to about 70 weight % of a polyacrylate of an aliphatic polyol; about 0.1 to 15 weight % of a photoinitiator, and 0 to 5 weight % of a thermal free-radical initiator, wherein the weight % is based on the total weight of the coating.

In one aspect, the invention comprises a coating comprising about 40 weight % of tricyclodecane dimethanol diacrylate, about 55 weight % of dipentaerythritol penta-acrylate and about 5% by weight of a photoinitiator, wherein the weight % is based on the total weight of the coating.

In one aspect the invention comprises a coating wherein the aliphatic diol comprises from 2 to 20 carbon atoms and wherein the aliphatic polyol comprises from 3 to 20 carbon atoms.

In one aspect the invention comprises a coating wherein the average molecular weight between cross-links in the coating is from about 100 g/mol to less than about 190 g/mol.

In one aspect the invention comprises an article comprising a thermoplastic polymer wherein the article has an interior cavity at least partially covered with a coating for a polymer, the coating comprising: a) a diacrylate of an aliphatic diol; b) a polyacrylate of an aliphatic polyol; and c) a photoinitiator, wherein the average molecular weight between cross-links is less than about 190 g/mol.

In one aspect the invention comprises an article comprising a thermoplastic polymer wherein the article has an interior cavity at least partial covered with a coating for a polymer, the coating comprising: a) a diacrylate of an aliphatic diol; b) a triacrylate of an aliphatic triol; and c) a photoinitiator, wherein the average molecular weight between cross-links ranges from about 100 g/mol to less than 190 g/mol.

In one aspect the invention comprises an article comprising the any of the coatings described herein and a thermoplastic wherein the thermoplastic comprises a copolyester, a polycarbonate, a polyacrylate, a polyurethane, a styrene acrylonitrile copolymer (SAN), a polyamide, polyethylene-co-methacrylic acid salt, polymethyl methacrylate (PMMA), poly(acrylonitrile-styrene-acrylate) (ASA), poly(acrylonitrile-butadiene-styrene) (ABS) or mixtures thereof.

In one aspect the invention comprises an article comprising any coating described above and a thermoplastic polymer wherein the thermoplastic polymer comprises a copolyester comprising a diacid component comprising from 60 to 100 mole % terephthalic acid residues and from 0 to 40 mole % of a modifying diacid residues and a glycol component comprising from 30 to 100 mole % CHDM residues, from 0 to 75 mole % ethylene glycol residues, and from 0 to 50 mole % of a modifying glycol residues.

In one aspect the invention comprises an article comprising any coating described above and a thermoplastic polymer wherein the thermoplastic polymer comprises a copolyester comprising a diacid component comprising from greater than 80 to 100 mole % terephthalic acid residues and from 0 to 20 mole % of a modifying diacid residues and a glycol component comprising from 50 to 100 mole % CHDM residues and from 0 to 50 mole % TMCD residues.

In one aspect the invention comprises an article comprising any coating described above and a thermoplastic polymer wherein the thermoplastic polymer comprises a copolyester comprising a diacid component comprising from 50 to 100 mole % terephthalic acid residues and from 0 to 50 mole % of a isophthalic acid 100 mole % residues and CHDM residues.

In one aspect the invention comprises an article comprising any coating described above and a thermoplastic polymer wherein the thermoplastic polymer comprises a copolyester comprising at least one recycled monomer that have been recovered by depolymerization of scrap or post-consumer polyesters, wherein the recycle monomer is selected from the group consisting of DMT, dimethyl isophthalate, ethylene glycol, 1,4-CHDA, 1,4-CHDM and 1,4-CHDA or 1,4-CHDM prepared from recycled DMT.

In one aspect the invention comprises an article comprising any coating described above and a thermoplastic polymer wherein the thermoplastic polymer has a solubility parameter ranging from about 9.4 to about 14.0 $(cal/cm^3)^{0.5}$ or ranging from about 10.5 to about 14.0 $(cal/cm^3)^{0.5}$. Alternatively, in one aspect the invention comprises an article comprising any coating described above and a thermoplastic polymer wherein the thermoplastic polymer has a solubility parameter ranging from 10.4 to 11.5 $(cal/cm^3)^{0.5}$. In other embodiments of the present invention the solubility parameter ranges from about 9.4 to about 14.0 $(cal/cm^3)^{0.5}$ or from about 10.0 to about 13.6 $(cal/cm^3)^{0.5}$ or about 10.0 to about 12.5 $(cal/cm^3)^{0.5}$ or about 10.4 to about 11.2 $(cal/cm^3)^{0.5}$.

In one aspect the invention comprises processes for making a coated article comprising applying a coating to be composed of a diacrylate of an aliphatic diol, a polyacrylate of an aliphatic polyol; and a photoinitiator, and curing the coating to have an average molecular weight between crosslinks in the coating is less than 190 g/mol. In one aspect the invention comprises a process in which the coating is applied to the thermoplastic polymer and cured prior to forming a shaped article. In one aspect the invention comprises a process in which the coating is applied to the thermoplastic polymer and cured after forming a shaped article.

In one aspect the invention comprises processes for making a coated article wherein the thermoplastic polymer comprises a copolyester comprising at least one recycled monomer that have been recovered by depolymerization of scrap or post-consumer polyesters, wherein the recycle monomer is selected from the group consisting of DMT, dimethyl isophthalate, ethylene glycol, 1,4-CHDA, 1,4-CHDM and 1,4-CHDA or 1,4-CHDM prepared from recycled DMT.

DETAILED DESCRIPTION

The present invention may be understood more readily by reference to the following detailed description of certain embodiments of the invention and the working examples.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "C1 to C5 hydrocarbons," is intended to specifically include and disclose C1 and C5 hydrocarbons as well as C2, C3, and C4 hydrocarbons.

Notwithstanding that the numerical ranges and parameters setting forth the broad scope of the invention arc approximations, the numerical values set forth in the specific examples are reported as precisely as possible. Any numerical value, however, inherently contains certain errors necessarily resulting from the standard deviation found in their respective testing measurements.

As used in the specification and the claims, the singular forms "a," "an" and "the" include their plural references unless the context clearly dictates otherwise. For example, reference to a "promoter" or a "reactor" is intended to include the one or more promoters or reactors. References to a composition or process containing or including "an" ingredient or "a" step is intended to include other ingredients or other steps, respectively, in addition to the one named.

The terms "containing" or "including," are synonymous with the term "comprising," and is intended to mean that at least the named compound, element, particle, or method step, etc., is present in the composition or article or method, but does not exclude the presence of other compounds, catalysts, materials, particles, method steps, etc, even if the other such compounds, material, particles, method steps, etc., have the same function as what is named, unless expressly excluded in the claims.

It is also to be understood that the mention of one or more method steps does not preclude the presence of additional method steps before or after the combined recited steps or intervening method steps between those steps expressly identified. Moreover, the lettering of process steps or ingredients is a convenient means for identifying discrete activities or ingredients and the recited lettering can be arranged in any sequence, unless otherwise indicated.

As used herein, therefore, the term "dicarboxylic acid" is intended to include dicarboxylic acids and any derivative of a dicarboxylic acid, including its associated acid halides, esters, half-esters, salts, half-salts, anhydrides, mixed anhydrides, or mixtures thereof, useful in a reaction process with a diol to make polyester. As used herein, the term "terephthalic acid" is intended to include terephthalic acid itself as well as any derivative of terephthalic acid, including its associated acid halides, esters, half-esters, salts, half-salts, anhydrides, mixed anhydrides, or mixtures thereof useful in a reaction process with a diol to make polyester. As used herein, the term "tetraol" is intended to mean a compound having four hydroxyl groups. As used herein, the term "pentaol" is intended to mean a compound having five hydroxyl groups. As used herein, the term "polyol" is intended to mean a compound having three or more hydroxyl groups. As used herein, the term "higher polyol" is intended to mean a compound having six or more hydroxyl groups. As used herein the terms "thermoplastic polymer," "thermoplastic resin," "thermoplastic substrate" and "thermoplastic" are used interchangeably. The term "residue," as used herein, means any organic structure incorporated into a polymer through a polycondensation and/or an esterification reaction from the corresponding monomer.

In one aspect, the invention comprises a coating wherein the coating comprises about 35 to about 65 weight % of a diacrylate of an aliphatic diol; about 35 to 65 weight % of a polyacrylate of an aliphatic polyol; and about 0.5 to 10 weight % of a photoinitiator, wherein the weight % is based on the total weight of the coating. In one aspect, the invention comprises a coating wherein the coating comprises about 40 to about 60 weight % of a diacrylate of an aliphatic diol; about 40 to 60 weight % of a polyacrylate of an aliphatic polyol; and about 0.5 to 10 weight % of a photoinitiator, wherein the weight % is based on the total weight of the coating.

In one aspect, the invention comprises a coating wherein the coating comprises about 35 to about 65 weight % of a diacrylate of an aliphatic diol; about 35 to 65 weight % of a triacrylate of an aliphatic triol; and about 0.5 to 10 weight % of a photoinitiator, wherein the weight % is based on the total weight of the coating. In one aspect, the invention comprises a coating wherein the coating comprises about 40 to about 60 weight % of a diacrylate of an aliphatic diol; about 40 to 60 weight % of a triacrylate of an aliphatic triol; and about 0.5 to 10 weight % of a photoinitiator, wherein the weight % is based on the total weight of the coating.

In all embodiments of the present invention the acrylates may comprise from 3 to 20 carbon atom, or 3 to 10 carbon atoms, or 3 to 5 carbon atoms, or 3 to 4 carbon atoms. In all embodiments of the present invention each of the acrylates in a diacrylate, triacrylate, tetraacrylate, penta-acrylate or polyacrylate may be the same or different. In all embodiments of the present invention at least one of the acrylates may comprise an alkyl substituted acrylate wherein the alkyl substituent comprises from 1 to 10 carbon atoms, or 1 to 8 carbon atoms, or 1 to 6 carbon atoms, or 1 to 4 carbon atoms, or 1 to 2 carbon atoms.

The polyesters used in the present invention typically can be prepared from dicarboxylic acids and diols which react in substantially equal proportions and are incorporated into the polyester polymer as their corresponding residues. The polyesters of the present invention, therefore, can contain substantially equal molar proportions of acid residues (100 mole %) and diol residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a polyester containing 30 mole % isophthalic acid, based on the total acid residues, means the polyester contains 30 mole % isophthalic acid residues out of a total of 100 mole % acid residues. Thus, there are 30 moles of isophthalic acid residues among every 100 moles of acid residues.

The present invention provides a coating composition that produces a protective finish to protect a thermoplastic substrate from exposure to fragrances. In contrast to the uncoated polymers in the examples, the coatings described in this invention impart improved resistance to hazing of the thermoplastic substrate upon exposure to various common components of fragrances.

According to the present invention, there is provided a coating composition comprising two or more acrylic monomers along with 0.5 to 10% of a photoinitiator. In the present invention it has been found that a certain level of crosslinking is useful to obtain the needed chemical resistance. In order to get this level of crosslinking the acrylic monomers must include at least one monomer with three or more reactive groups on it. The monomers may also include one or more difunctional monomers.

1,-6-Hexanediol diacrylate, dipropylene glycol diacrylate, and tricyclodecane dimethanol diacrylate are examples of difunctional acrylic monomers which may be included in the coating. Trimethylolpropane triacrylate and pentaerythritol triacrylate are examples of trifunctional acrylic monomers which may be included in this coating. Examples of higher functional acrylic monomers which may be included in this invention are: pentaerythritol tetraacrylate which has four reactive groups per molecule and dipentaerythritol pentaacrylate which has five reactive groups per molecule. In one aspect, the coating of the present invention comprises polyacrylates of higher polyols having six or more hydroxyl groups.

The photoinitiator used can be any photoinitiator conventional photoinitiator. These include, but are not limited to: alpha-hydroxyketones, phenylglyoxalates, benzyldimethyl ketals, α-aminoketones, mono acyl phosphine oxides (MAPO), bis acyl phosphine oxides (BAPO), phosphine oxides. Specific photoinitiators include, but are not limited to, benzophenone, 1-hydroxy-cyclohexylphenyl-ketone (Irgacure™ 184), methylbenzoylformate (Darocur™ MBF), alpha, alpha-diethoxy-alpha phenylacetophenone, 1-hydroxycyclohexyl benzophenone, phenyl bis(2,4,6-trimethyl benzoyl)phosphine oxide sold under the tradename (Irgacure™ 819) and diphenyl(2,4,6-trimethylbenozyl)phosphine oxide. The photoinitiators may be used singly or in combination. Products identified with the Irgacure and Darocur trademarks are available from BASF.

Thermal initiators may be any conventional thermal initiator and are typically selected from organic peroxides and azo compounds. DuPont offers azo compounds commercially under the Vazo™ trade name.

Measuring the actual crosslink density of a coating is difficult to do. An easier means of assessing the crosslink density of a coating is to calculate the average molecular weight of the polymer chains between crosslinks; denoted by $M_C$. While $M_C$ is not the crosslink density, it can be considered as inversely proportional to the crosslink density. The theoretical molecular weight of the polymer chain between crosslinks for a coating containing multiple monomers is given by equation (1):

$$M_C = (\Sigma Ni * Mi)/\Sigma Ni(Fi-1) \qquad (1)$$

Where Ni is the number average of monomer i, Mi is the molecular weight of monomer i, and Fi is the functionality of monomer i.

In the present invention it has been found that the degree of crosslinking useful to obtain sufficient chemical resistance has an average molecular weight between crosslinks is less than 190 g/mole or greater than 150 to less than 190 g/mole or greater than 100 to less than 190 gram/mole or greater than 100 to 150 g/mole. Thus the invention describes a coating composition comprising acrylic monomers with trifunctionality or higher functionality, optionally along with some difunctional acrylic monomers and 0.5-10 weight % of a photoinitiator such that the average molecular weight between crosslinks in the coating is less than 190 g/mole.

In all embodiments of the present invention, the coating may be applied by any conventional method such as spraying, dipping, and brushing. In one aspect the invention comprises an article comprising any coating describe above wherein the article has an interior and an external surface and the coating is applied to the interior surface. In one aspect the invention comprises an article comprising any coating describe above wherein the article has an interior and an external surface and the coating is applied to the exterior surface. In one aspect the invention comprises an article comprising any coating describe above wherein the article has an interior and an external surface and the coating is applied to the interior and exterior surfaces.

After the coating is applied to a polymer substrate, the photo initiated polymerization may occur by directing the output of a radiation source directly onto the coating. The radiation source includes, but is not limited to, ultra-violet radiation (UV) or electron beam. Alternatively, the coating may be cured thermally. Alternatively, the output of the radiation source may be directed through the polymer substrate in order to initiate the polymerization of the coating. The radiation source is not critical and may use any conventional photoinitiator source, for example, a Fusion UV Systems HP-6/VPS-3 curing station.

In one embodiment of the present invention, the coating composition comprises about 40 weight % of tricyclodecane dimethanol diacrylate, about 55 weight % of dipentaerythritol penta-acrylate and about 5% by weight of a photoinitiator, wherein the weight % is based on the total weight of the coating, may be formulated with Irgacure 819, a BAPO-type initiator that facilitates cure through the plastic by absorbing longer (typically 300-400 nm) wavelengths of light. The coating composition may also contain a co-initiator, such as Esacure™ One (available from Lamberti), an α-hydroxy ketone. This coating composition allows the option of immediate curing using longer wavelengths of light that pass through the polyester container without significant yellowing of the plastic. It is also possible to pre-cure the coating composition on the container by exposure to daylight or fluorescent room light over a period of hours to immobilize the coating before exposure to the UV source. Pre-curing is useful to prevent sagging or pooling of the uncured coating composition as there is often ambient heat associated with UV curing. If cure time is not a limitation, exposure to daylight or room light over a period of several days to several weeks can effect the cure of the coating composition sufficiently to provide a high degree of chemical resistance without the final cure under intense UV light. Photoinitiators that are activated by longer wavelengths (typically 300-400 nm) of UV light are typically yellow colored and are typically used for thin films of less than 2-mil in thickness.

The coating compositions of the present invention as exemplified by the coating composition comprising about 40 weight % of tricyclodecane dimethanol diacrylate, about 55 weight % of dipentaerythritol penta-acrylate and about 5% by weight of a photoinitiator, wherein the weight % is based on the total weight of the coating, may be formulated with a photoinitiator and a thermally activated co-initiator. UV curing processes, although effected by light, often have substantial amounts of residual heat present. Elevated temperatures are used to activate compounds that decompose with the generation of free radicals. Commercially, azo compounds (Vazo®, a DuPont trade name) and organic peroxides (e.g., Perkadox®, an Akzo-Nobel trade name or Luperox® an Arkema trade name) are used as thermally activated initiators of acrylates and methacrylates in both solution and bulk processes. Azo compounds and organic peroxides are both useful classes of thermal initiators as they typically lack color in the neat form and typically do not generate color during thermal decomposition. UV-cure processes are often characterized by short times that are typically minutes or preferably seconds.

Selection of the thermal initiator is dictated by the actual process conditions encountered during the UV curing operation where temperatures up to 100° C. may provide adequate thermal energy to generate free radicals for times of <5 minutes. Half-life ($t_{1/2}$) is the time for 50% of the thermal initiator to decompose at a specified temperature and a $t_{1/2}$ between about 75 to 100° C. is preferred since the coating composition is typically applied warm (<50° C.), a condition where a low $t_{1/2}$ would result in poor pot life of the uncured coating composition. Conversely, a high $t_{1/2}$ would result in little free radical generation unless the process temperature was elevated to the near the glass transition temperature of the polyester which could cause the container to deform. Common amorphous polyesters have glass transitions between 70-120° C. with Tritan™ copolyesters (available from Eastman Chemical Company) preferred as they have glass transitions greater than 100° C. AIBN (2,2'-azobisisobutyronitrile), having a 1 hour $t_{1/2}$ of 82° C., and benzoyl peroxide (BPO), having a 1 hour $t_{1/2}$ of 92° C., are preferred thermal initiators. In some cases, the photoinitiator and thermal initiator are synergistic where either the thermal initiator has some UV sensitivity (i.e., decomposition) or the decomposition of the photoinitiator promotes decomposition of the thermal initiator.

Typically, for any embodiment of the present invention, thermal initiators are used in processes that result in the polymer substrate reaching a temperature less than about 10° C. less than the Tg of the polymer substrate or less than about 20° C. less than the Tg of the polymer substrate. Typically, for any embodiment of the present invention, photoinitiators are used in processes that result in the polymer substrate reaching a temperature less than about 10° C. less than the Tg of the polymer substrate or less than about 20° C. less than the Tg of the polymer substrate. Typically, for any embodiment of the present invention, a combination of thermal initiators and photoinitiators is used in processes that result in the polymer substrate reaching a temperature less than about 10° C. less than the Tg of the polymer substrate or less than about 20° C. less than the Tg of the polymer substrate.

Any of the coating compositions of the present invention may be formulated with conventional photoinitiators (i.e., for shorter wavelengths less than 300 nm) that are essentially non-colored in the neat form. A preferred example is Irgacure™ 184, where amounts greater than 1 wt % allow for adequate curing through the polyester using shorter (<300 nm) wavelength UV source. The higher level of photoinitiator allows for cure times to be generally less than 1 minute. While the coating composition does not yellow during curing, The plastic substrate may develop yellowing when exposed to shorter wavelengths of UV light. There are some options that reduce this effect, such as UV stabilization of the plastic, thinner walled containers, and shorter process times. In some applications, yellowness of the plastic is not an aesthetic performance requirement.

Any of the coating compositions comprising a photoinitiator may use either direct curing with direct exposure to UV light or direct curing with frontal propagation. Frontal propagation refers to the curing of the coating composition outside of the material directly exposed to UV light.

The uncoated polymers typically have L* values of greater than 60.5 or greater than 61.5 or greater than 62.5, as measured by ASTM E308. The coated articles after exposure to 33 weight % of 2-sec-butylcyclohexanone or phenethyl acetate in ethanol for four weeks at 50° C. have haze values of less than 15%, or less than 10% or less than 5 or less than 1% as measured according to ASTM D1003. The coated articles after exposure to 33 weight % of 2-sec-butylcyclohexanone or phenethyl acetate in ethanol for four weeks at 50° C. have haze values increases, relative to uncoated polymer under the same test conditions, of less than 5%, or less than 4% or less than 4 or less than 2 or less than 1% as measured according to ASTM D1003.

In one aspect the invention comprises processes for making a coated article comprising applying a coating comprising a diacrylate of an aliphatic diol, a polyacrylate of an aliphatic polyol; and a photoinitiator, and curing the coating to have an average molecular weight between crosslinks in the coating is less than 190 g/mol. These processes for making a coated article can be applied to all embodiments of the coating and all of the polymer substrates described herein.

The coatings of the present invention described hereinabove may be used to fabricate shaped articles such as, for example, sheets, films, tubes, preforms, bottles, or profiles. Such articles may be formed by any means well known to persons skilled in the art such as, for example, by extrusion, calendering, thermoforming, blow-molding, extrusion blow-molding, injection molding, compression molding, casting, drafting, tentering, or blowing.

These thermoplastic resins useful in this invention may be made by any conventional process. In one aspect the invention comprises an article wherein the thermoplastic polymer has a solubility parameter ranging from about 9.4 to about 14.0 $(cal/cm^3)^{0.5}$. In an embodiment, the thermoplastic article comprises a thermoplastic polymer, particularly the polyesters, having a solubility parameter ranging from 10.4 to 11.5 $(cal/cm^3)^{0.5}$. In other embodiments of the present invention the solubility parameter ranges from about 9.4 to about 14.0 $(cal/cm^3)^{0.5}$ or from about 10.0 to about 13.6 $(cal/cm^3)^{0.5}$ or about 10.0 to about 12.5 $(cal/cm^3)^{0.5}$ or about 10.4 to about 11.2 $(cal/cm^3)^{0.5}$. Examples of thermoplastic polymers having suitable solubility parameters include, but are not limited to, polyesters, polycarbonates, polyacrylates, polyurethanes, polyethylene-co-methacrylic acid salt and polyamides. For example, the solubility parameter for a polycarbonate resin is about 10.8 $(cal/cm^3)^{0.5}$; the solubility parameter for a SAN resin, with 32% acrylonitrile, is about 9.7 $(cal/cm^3)^{0.5}$; the solubility parameter for a PMMA resin of about 9.45 $(cal/cm^3)^{0.5}$. Examples of thermoplastic resins that are not suitable are polypropylene and polyethylene each of which has a solubility parameter of approximately 8.0 $(cal/cm^3)^{1/2}$. Examples of suitable polymers include Tritan™ copolyesters and Eastar™ polyesters from Eastman Chemical Company and Surlyn™ from E.I. du Pont de Nemours.

The polymers useful in the invention can comprise from 0 to 10 weight % (weight %), for example, from 0.01 to 5 weight %, from 0.01 to 1 weight %, from 0.05 to 5 weight %, from 0.05 to 1 weight %, or from 0.1 to 0.7 weight %, based on the total weight of the polymer, respectively, of one or more residues of a branching monomer, also referred to herein as a branching agent, having 3 or more carboxyl substituents, hydroxyl substituents, or a combination thereof. In certain embodiments, the branching monomer or agent may be added prior to and/or during and/or after the polymerization of the polyester. The polymer(s) useful in the invention can thus be linear or branched. In certain embodiments, the branching monomer or agent may be added prior to and/or during and/or after the polymerization of the polymer.

One or more branching agents may also be useful in making the polyesters formed within the context of the invention. The branching agent can be one which provides branching in the acid unit portion of the polyester, or in the glycol unit portion, or it can be a hybrid. Illustrative of such branching agents are polyfunctional acids, polyfunctional glycols and acid/glycol hybrids. Examples of multifunctional acids and multifunctional alcohols include tri or tetracarboxylic acids, such as trimesic acid, trimellitic acid, citric acid, tartaric acid, 3-hydroxyglutaric acid and pyromellitic acid and lower alkyl esters thereof and the like, and tetrols such as pentaerythritol. Also triols such as trimethylolpropane or dihydroxy carboxylic acids and hydroxydicarboxylic acids and derivatives, such as dimethyl hydroxy terephthalate, and the like are useful within the context of this invention. Trimellitic anhydride is a preferred branching agent. In one embodiment, the branching monomer residues comprise about 0.1 to about 0.7 mole % of one or more residues of: trimellitic anhydride, pyromellitic dianhydride, glycerol, sorbitol, 1,2,6-hexanetriol, pentaerythritol, trimethylolethane, or trimesic acid. The branching monomer may be added to the polyester reaction mixture or blended with the polyester in the form of a concentrate as described, for example, in U.S. Pat. Nos. 5,654,347 and 5,696,176, the disclosure regarding branching monomers which is incorporated herein by reference. The branching agents may be used either to branch a polymer or mixture of polyesters.

The polyester portion of the polyester composition useful in the invention can be made by processes known from the literature such as, for example, by processes in homogenous solution, by transesterification processes in the melt, and by two phase interfacial processes. Suitable methods include the steps of reacting one or more dicarboxylic acids with one or more glycols at a temperature of about 100° C. to 315° C. at a pressure of about 0.1 to 760 mm Hg for a time sufficient to form a polyester. See U.S. Pat. No. 3,772,405 for methods of producing polyesters, the disclosure of such methods which is incorporated herein by reference.

Examples of copolyesters that are useful in all embodiments of the present invention include, but are not limited to, copolyesters comprising: (i) a diacid component comprising 100 mole % terephthalic acid, and a diol component comprising about 10 to about 40 mole % 1,4-cyclohexanedimethanol and about 60 to about 90 mole % ethylene glycol; (ii) a diacid component comprising 100 mole % terephthalic acid and a diol component comprising about 10 to about 99 mole % of 1,4-cyclohexanedimethanol, 0 to about 90 mole % of ethylene glycol, and about 1 to about 25 mole % of diethylene glycol; (iii) a diacid component comprising 100 mole % terephthalic acid and a diol component comprising about 50 to about 90 mole % 1,4-cyclohexane-dimethanol and about 10 to about 50 mole % ethylene glycol; (iv) a diacid component comprising about 90 to 100 mole % 1,4-cyclohexanedicarboxylic acid and a diol component comprising about 90 to 100 mole % 1,4-cyclohexanedimethanol; (v) a diacid component comprising about 65 mole % terephthalic acid and about 35 mole % isophthalic acid; (vi) a diacid component comprising 100 mole % terephthalic acid and a diol component comprising 31 mole % CHDM and 69 mole % ethylene glycol; (vii) a diacid component comprising 100 mole % terephthalic acid and a diol component comprising 77 mole % CHDM and 23 mole % TMCD; and (viii) a diacid component comprising 65 mole % terephthalic acid and 35 mole % isophthalic acid, and a diol component comprising 100 and a diol component comprising 100 mole % CHDM.

In another aspect, the invention relates to articles comprising any of the coatings described herein and a thermoplastic polymer comprising a polyester produced by a process comprising:
 (I) heating a mixture comprising the monomers useful in any of the polyesters in the invention in the presence of a catalyst at a temperature of about to 240° C. for a time sufficient to produce an initial polyester;
 (II) heating the initial polyester of step (I) at a temperature of 240 to 320° C. for about 1 to 4 hours; and
 (III) removing any unreacted glycols.

Suitable catalysts for use in this process include organozinc or tin compounds. The use of this type of catalyst is well known in the art. Examples of catalysts useful in the present invention include, but are not limited to, zinc acetate, butyltin tris-2-ethylhexanoate, dibutyltin diacetate, and dibutyltin oxide. Other catalysts may include those based on titanium, zinc, manganese, lithium, germanium, and cobalt. Catalyst amounts typically range from about 10 ppm to about 500 ppm based on the catalyst metal. The process can be carried out in a batch or continuous process.

Terephthalic acid or an ester thereof, such as, for example, dimethyl terephthalate, makes up the dicarboxylic acid component used to form the present polyester at a concentration of at least 60 mole %, such as at least 70 mole %, such as at least 80 mole %, at least 90 mole % at least 95 mole %, at least 99 mole %, or 100 mole %. Polyesters with higher amounts of terephthalic acid can possess higher impact strength properties. The terms "terephthalic acid" and "dimethyl terephthalate" are used interchangeably herein. In one embodiment, dimethyl terephthalate is part or all of the dicarboxylic acid component of the polyesters useful in the present invention.

In all embodiments, ranges of from 60 to 100 mole %, or 70 to 100 mole %; or 80 to 100 mole %; or 90 to 100 mole %; or 99 to 100 mole %; or 100 mole % terephthalic acid and/or dimethyl terephthalate may be used.

In addition to terephthalic acid, the dicarboxylic acid component of the polyester useful in the invention can comprise up to 40 mole %, such as up to 30 mole %, such as up to 20 mole %, such as up to 10 mole %, up to 5 mole %, or up to 1 mole % of one or more modifying aromatic dicarboxylic acids. Certain embodiments can also contain 0.01 or more mole %, such as 0.1 or more mole %, 1 or more mole %, 5 or more mole %, or 10 or more mole % of one or more modifying aromatic dicarboxylic acids. Yet another embodiment contains 0 mole % modifying aromatic dicarboxylic acids. Thus, if present, it is contemplated that the amount of one or more modifying aromatic dicarboxylic acids can range from any of these preceding endpoint values including, for example, from 0.01 to 20 mole % and from 0.1 to 10 mole %. Modifying aromatic dicarboxylic acids which may be used in the present invention are those having up to 20 carbon atoms, and which are linear, para-oriented, or symmetrical. Examples of modifying aromatic dicarboxylic acids which may be used in this invention include, but are not limited to, isophthalic acid, 4,4'-biphenyldicarboxylic acid, 1,4-, 1,5-, 2,6-, 2,7-naphthalenedicarboxylic acid, and trans-4,4'-stilbenedicarboxylic acid, and esters thereof. In one embodiment, isophthalic acid is the modifying aromatic dicarboxylic acid.

The carboxylic acid component of the polyesters useful in the invention can be further modified with up to about 40 mole %, such as up to 30 mole %, such as up to 20 mole %, such as up to 10 mole %, such as up to 5 mole % or up to 1 mole % of one or more of one or more aliphatic dicarboxylic acid containing 2-16 carbon atoms, such as, for example, malonic, succinic, glutaric, adipic, pimelic, suberic, azelaic and dodecanedioic dicarboxylic acids. Certain embodiments can also contain greater than 0.01 mole %, such as greater than 0.1 mole %, greater than 1 mole %, or greater than 5 mole % of one or more modifying aliphatic dicarboxylic acids. Yet another embodiment contains 0 mole % modifying aliphatic dicarboxylic acids. Thus, if present, it is contemplated that the amount of one or more modifying aliphatic dicarboxylic acids can range from any of these preceding endpoint values including, for example, from 0.01 to 10 mole % and from 0.1 to 10 mole %. The total mole % of the dicarboxylic acid component is 100 mole %.

In one aspect the polymers useful in the present invention have crystallization half-times greater than 3 minutes, or greater than 5 minutes or greater than 12 minutes or greater than 15 minutes. In one aspect the polyesters useful in the present invention have crystallization half-times greater than 3 minutes, or greater than 5 minutes or greater than 12 minutes or greater than 15 minutes. Esters of terephthalic acid and the other modifying dicarboxylic acids or their corresponding esters and/or salts may be used instead of the dicarboxylic acids. Suitable examples of dicarboxylic acid esters include, but are not limited to, the dimethyl, dipropyl, diisopropyl, dibutyl, and diphenyl esters.

The 1,4-cyclohexanedimethanol may be cis, trans, or a mixture thereof, for example, about a cis:trans ratio of 60:40 to 40:60. In another embodiment, the trans-1,4-cyclohexanedimethanol is present in the amount of 60 to 80 mole %.

The glycol component of the polyester portion of the polyester compositions useful in the invention can contain 50 mole % or less, 40 mole % or less, 30 mole % or less, 25 mole % or less, 20 mole % or less, 10 mole % or less, 5 mole % or less of one or more modifying glycols which are not 2,2,4,4-tetramethyl-1,3-cyclobutanediol or 1,4-cyclohexanedimethanol; in one embodiment, the polyesters useful in the invention may contain less than 15 mole % of one or more modifying glycols. In another embodiment, the polyesters useful in the invention can contain 10 mole % or less of one or more modifying glycols. In another embodiment, the polyesters useful in the invention can contain 5 mole % or less of one or more modifying glycols. In another embodiment, the polyesters useful in the invention can contain 3 mole % or less of one or more modifying glycols. In another embodiment, the polyesters useful in the invention can contain 0 mole % of one or more modifying glycols. Certain embodiments can also contain 0.01 or more mole %, such as 0.1 or more mole %, 1 or more mole %, 5 or more mole %, or 10 or more mole % of one or more modifying glycols. Thus, if present, it is contemplated that the amount of one or more modifying glycols can range from any of these preceding endpoint values including, for example, from 0.01 to 15 mole % and from 0.1 to 10 mole %.

Modifying glycols useful in the polyesters useful in the invention refer to diols other than 2,2,4,4-tetramethyl-1,3-cyclobutanediol and 1,4-cyclohexanedimethanol and may contain 2 to 16 carbon atoms. Examples of suitable modifying glycols include, but are not limited to, ethylene glycol, 1,2-propanediol, 1,3-propanediol, neopentyl glycol, 1,4-butanediol, 1,5-pentanediol, 1,6-hexanediol, p-xylene glycol or mixtures thereof. In one embodiment, the modifying glycol is ethylene glycol. In other embodiments, the modifying glycols are 1,3-propanediol and 1,4-butanediol. In another embodiment, ethylene glycol is excluded as a modifying diol. In another embodiment, 1,3-propanediol and 1,4-butanediol are excluded as modifying diols. In another embodiment, 2,2-dimethyl-1,3-propanediol is excluded as a modifying diol.

It will be apparent to persons skilled in the art that copolyesters can be prepared using recycled monomers that have been recovered by depolymerization of scrap or post-consumer polyesters, or a combination of virgin and recycled monomers. Processes for the depolymerization of polyesters into their component monomers are well-known. For example, one known technique is to subject the polyester, typically PET, to methanolysis in which the polyester is reacted with methanol to produce dimethyl terephthalate, dimethyl isophthalate, ethylene glycol ("EG"), and 1,4-cyclohexanedimethanol, depending on the composition of the polyester. Some representative examples of the methanolysis of PET are described in U.S. Pat. Nos. 3,321,510; 3,776,945; 5,051,528; 5,298,530; 5,576,456; and 6,262,294 which are incorporated herein by reference. In a typical methanolysis process, the scrap PET resin is dissolved in oligomers of dimethyl terephthalate and ethylene glycol. Superheated methanol is then passed through the solution and reacts with the dissolved polyester and polyester oligomers to form dimethyl terephthalate and ethylene glycol. These monomers can be recovered by distillation, crystallization, or a combination thereof. For example, U.S. Pat. No. 5,498,749 describes the recovery and purification of dimethyl terephthalate from depolymerization process mixtures containing 1,4-cyclohexanedimethanol.

Glycolysis is another commonly used method of depolymerizing polyesters. A typical glycolysis process can be illustrated with particular reference to the glycolysis of PET, in which waste PET is dissolved in and reacted with a glycol, typically ethylene glycol, to form a mixture of dihydroxyethyl terephthalate and low molecular weight terephthalate oligomers. This mixture is then subjected to a transesterification with a lower alcohol, i.e., methanol to form dimethyl terephthalate and ethylene glycol. The DMT and ethylene glycol can be recovered and purified by distillation or a combination of crystallization and distillation. Some representative examples of glycolysis methods can be found in U.S. Pat. Nos. 3,907,868; 6,706,843; and 7,462,649 which are incorporated herein by reference.

The recycled DMT and ethylene glycol may be used directly in polycondensation reactions to prepare polyesters and copolyesters. The DMT can be hydrolyzed to prepare terephthalic acid or hydrogenated to 1,4-CHDM using known procedures. Similarly, TPA prepared from recycled DMT can be hydrogenated to form 1,4-cyclohexanedicarboxylic acid (1,4-CHDA). The TPA, 1,4-CHDA, and CHDM may then be repolymerized into copolyesters. The recycled monomers can be repolymerized into polyesters using typical polycondensation reaction conditions well-known to persons skilled in the art. They may be made by continuous, semi-continuous, and batch modes of operation and may utilize a variety of reactor types. Examples of suitable reactor types include, but are not limited to, stirred tank, continuous stirred tank, slurry, tubular, wiped-film, falling film, and extrusion reactors. The polyesters may comprise only recycled monomers or a mixture of recycled and virgin monomers. For example, the proportion of the diacid and diol residues that are from recycled monomers can each range from about 0.5 to about 100 mole %, based on a total of 100 mole % diacid residues and 100 mole % diol residues.

Some examples of copolyesters that may be prepared from recycled DMT, dimethyl isophthalate, ethylene glycol, and 1,4-CHDA and 1,4-CHDM prepared from recycled DMT include copolyesters in which the diacid component comprises from about 60 to 100 mole % of terephthalic acid and the diol component comprises mixtures of CHDM and EG in which the CHDM ranges from 10-90 mole % and the EG ranges from 90-10 mole %. In another example, the diacid component can comprise about 60 to 100 mole % terephthalic acid and the diol component can comprise mixtures of CHDM and 2,2,4,4-tetramethylcyclobutanediol ("TMCD") wherein the CHDM ranges from 50-90 mole % and the TMCD ranges from 10-50 mole %. In still another example, the diacid component can comprise mixtures of 50 to 95 mole % terephthalic acid and 5 to 50 mole % isophthalic acid.

Additional examples of copolyesters that can be prepared with the above recycled monomers include, but are not limited to, copolyesters comprising: (i) a diacid component comprising 100 mole % terephthalic acid, and a diol component comprising about 10 to about 40 mole % 1,4-cyclohexanedimethanol and about 60 to about 90 mole % ethylene glycol; (ii) a diacid component comprising 100 mole % terephthalic acid and a diol component comprising about 10 to about 99 mole % of 1,4-cyclohexane-dimethanol, 0 to about 90 mole % of ethylene glycol, and about 1 to about 25 mole % of diethylene glycol; (iii) a diacid component comprising 100 mole % terephthalic acid and a diol component comprising about 50 to about 90 mole % 1,4-cyclohexanedimethanol and about 10 to about 50 mole % ethylene glycol; (iv) a diacid component comprising about 90 to 100 mole % 1,4-cyclohexanedicarboxylic acid and a diol component comprising about 90 to 100 mole % 1,4-cyclohexanedimethanol; (v) a diacid component comprising about 65 mole % terephthalic acid and about 35 mole % isophthalic acid; (vi) a diacid component comprising 100 mole % terephthalic acid and a diol component comprising 31 mole % CHDM and 69 mole % ethylene glycol; (vii) a diacid component comprising 100 mole % terephthalic acid and a diol component comprising 77 mole % CHDM and 23 mole % TMCD; and (viii) a diacid component comprising 65 mole % terephthalic acid and 35 mole % isophthalic acid, and a diol component comprising 100 and a diol component comprising 100 mole % CHDM. When prepared from recycled monomers of sufficient purity, the above copolyesters are indistinguishable from the same copolyesters prepared from virgin monomers.

The term "polycarbonate" is herein defined as the condensation product of a carbonate source and a diol source, having a carbonate component containing 100 mole % carbonate units and a diol component containing 100 mole % diol units, for a total of 200 mole % monomeric units or 100 mole % "repeating units." In one embodiment of the present invention, the polycarbonate portion of the first component is based upon the polycarbonate of 4,4'-isopropylidenediphenol, commonly known as bisphenol A polycarbonate. A wide variety of the linear or branched polycarbonates that may be utilized in the present invention may be derived from bisphenol A and can be prepared according to procedures well known in the art such as, for example, as disclosed in U.S. Pat. Nos. 3,030,335 and 3,317,466.

Examples of bisphenol A polycarbonates that may be used in the present invention and are available commercially include the materials marketed under the tradenames LEXAN®, available from the General Electric Company or Sabic Innovative Plastics IP BV Company, and MAKROLON®, available from Bayer, Inc. The polycarbonate may further comprise the residues of one or more branching agents such as, for example, tetraphenolic compounds, tri-(4-hydroxyphenyl)ethane, pentaerythritol triacrylate and others compounds as disclosed in U.S. Pat. Nos. 6,160,082; 6,022,941; 5,262,511; 4,474,999; and 4,286,083. Other representative examples of methods of producing polycarbonates are described in U.S. Pat. Nos. 5,498,688; 5,494,992; and 5,489,665.

The term "polyamide," as used herein, is intended to include synthetic polymers prepared by the polycondensation of one or more difunctional carboxylic acids with one or more difunctional amines or by the ring-opening polymerization of a lactam and may include homopolymers and copolymers. For example, the difunctional carboxylic acid can be a dicarboxylic acid such as adipic acid or isophthalic acid, and the difunctional amines can be a diamine such as, for example, hexamethylene diamine or m-xylylenediamine. The term "copolyamide," as used herein, is understood to mean a polyamide comprising at least 2, chemically distinct repeating units. For example, MXD6 nylon is not a copolyamide because it contains only a single, chemically distinct repeating unit containing the residues of adipic acid and m-xylylenediamine. By contrast, poly(hexamethylene adipamide-co-isophthalamide), prepared by the condensation of hexamethylenediamine with adipic and isophthalic acid, has two chemically distinct repeating units, that is, a repeating unit containing the residues of hexamethylenediamine and adipic acid, and another repeating unit containing the residues of hexamethylene diamine and isophthalic acid.

"DMT" means dimethyl terephthalate. "1,4-CHDA" means 1,4-cyclohexanedicarboxylic acid. "1,4-CHDM" means 1,4-cyclohexane dimethanol. "EG" means ethylene glycol. "TPA" means terephthalic acid.

EXAMPLES

This invention can be further illustrated by the following examples of preferred embodiments thereof, although it will be understood that these examples are included merely for purposes of illustration and are not intended to limit the scope of the invention unless otherwise specifically indicated. The starting materials are commercially available unless otherwise indicated. Unless indicated otherwise, parts are parts by weight, temperature is in degrees C. or is at room temperature, and pressure is at or near atmospheric.

For all of these examples, the various thermoplastic copolyesters were injection molded into 4"×4"×⅛" plaques. Both surfaces of these plaques were coated with a basic UV curable coating. A basic photoinitiator was utilized in the coating formulations. Plaques of differing coating thicknesses were prepared by applying the coatings with a rod having wires with various gaps between them. The coated plaques were cured by two passes through a Fusion UV Systems HP-6/VPS-3 curing station equipped with a model LC-6 conveyor system at 20 ft/min. The lamp focus was fixed at ⅛" above the conveyor surface. Each side of the plaques were coated and cured in separate steps. The curing conditions, based on the cumulative irradiance and dosage was measured on an EIT Power Puck® radiometer.

After the coating and curing of the copolyesters, the plaques were sawn into 1"×1"×⅛" sections on a bandsaw. One section of each plastic/formulation/thickness combination was placed in a separate vial of a specific fragrance composed of 33% of a given essential oil in ethanol. The edges of the sections were left uncoated. These test samples were then subjected to high temperature aging in a forced air oven for the times and temperatures specified in the examples below.

After the exposure period, the sample sections were rinsed with ethanol and dried. They were then examined for percent haze on a BYK-Gardner XL-211 Hazegard instrument by measuring only the center portion of each sample. This positioning avoided the hazing of the samples near the uncoated edges. The haze measurements were made following ASTM D1003.

Example 1

The following thermoplastic copolyesters were used in this example. Copolyester A contained terephthalic acid, 23 mole % 2,2,4,4, tetramethyl-1,3 cyclobutanediol, and 77 mole % cyclohexanedimethanol. The inherent viscosity was measured to be 0.72 (±0.03). Copolyester B contained 65 mole % terephthalic acid, 35 mole % isophthalic acid and cyclohexanedimethanol. The inherent viscosity was measured to be 0.62 (±0.03). The coating consisted of 47.5% hexanediol diacrylate (Sartomer SR238), 47.5% trimethylolpropane triacrylate (Photomer 4006), and 5% 1-Hydroxycyclohexyl Phenyl Ketone (Irgacure 284). Using equation 1, the average molecular weight between crosslinks was calculated to be 178.9 g/mole. A coating thickness of 36 microns was applied to the molded plaques. The coated plaques were exposed to the 33% of the following essential oils in ethanol: 2-sec-Butylcyclohexanone, D-Camphor, Citronellal, and Phenethyl acetate. The exposure period was 4 weeks at 50° C. The measured haze values after the 4 week exposures are listed in Table 1. Haze values for uncoated plaques after the same exposures are also listed in Table 1. It is clear that the presence of the coating significantly reduces the haze of the exposed plaques. The haze values slightly less than 0% are assumed to be essentially within experimental error of 0% haze.

TABLE 1

| ESSENTIAL OIL | UNITS | 2-sec BUTYL CYCLO-HEXANONE | D-CAMPHOR | CITRONELLOL | PHENETHYL ACETATE |
|---|---|---|---|---|---|
| HAZE COPOLYESTER A | % | −0.56 | −0.93 | −0.12 | 0.98 |

TABLE 1-continued

| ESSENTIAL OIL | UNITS | 2-sec BUTYL CYCLO-HEXANONE | D-CAMPHOR | CITRONELLOL | PHENETHYL ACETATE |
|---|---|---|---|---|---|
| HAZE COPOLYESTER B | % | 6.43 | 5.70 | 6.19 | 11.04 |
| UNCOATED RESULTS | % | [ ] | [ ] | [ ] | [ ] |
| HAZE COPOLYESTER A | % | 16.60 | 2.26 | 0.78 | 54.60 |
| HAZE COPOLYESTER B | % | 25.40 | 9.02 | 12.50 | 69.20 |

Comparative Example 1

A 36 micron coating was again applied to Copolyester A and Copolyester B. The composition of Comparative Coating A was 75% hexanediol diacrylate (Sartomer SR238), 20% trimethylolpropane triacrylate (Photomer 4006), and 5% 1-Hydroxycyclohexyl Phenyl Ketone (Irgacure 284). Using equation 1, the average molecular weight between crosslinks was calculated to be 203.4 g/mole. These coated plaques were exposed to the same essential oil solutions as in Example 1 for 4 weeks at 50° C. The haze values after the exposures are listed in Comparative Table 1. In all cases, this comparative coating is less effective in reducing the amount of haze induced by exposure to essential oils.

COMPARATIVE TABLE 1

| ESSENTIAL OIL | UNITS | 2-sec BUTYL CYCLO-HEXANONE | D-CAMPHOR | CITRONELLOL | PHENETHYL ACETATE |
|---|---|---|---|---|---|
| HAZE COPOLYESTER A | % | 14.2 | 0.5 | 1.0 | 9.5 |
| HAZE COPOLYESTER B | % | 10.03 | 11.39 | 15.1 | 31.3 |

Example 2

A 50 micron thick coating was applied to Copolyester A and Copolyester C. Copolyester C contained terephthalic acid, 69 mole % ethylene glycol, and 31 mole % cyclohexanedimethanol. The inherent viscosity was measured to be 0.72 (±0.03). Coating A from Example 1 was again used. The coated plaques were exposed to the 33% of the following essential oils in ethanol: Benzyl Acetate and Phenethyl acetate. The exposure period was 3 weeks at 45° C. The measured haze values after the 4 week exposures are listed in Table 2. Haze values for uncoated plaques after the same exposures are also listed in Table 2. It is clear that the presence of the coating significantly reduces the haze of the exposed plaques. The haze values greater than 100% are assumed to essentially be 100% haze within experimental error.

TABLE 2

| ESSENTIAL OIL | UNITS | BENZYL ACETATE | PHENETHYL ACETATE |
|---|---|---|---|
| HAZE COPOLYESTER A | % | −0.6 | −0.8 |
| HAZE COPOLYESTER C | % | 1 | −0.5 |
| UNCOATED RESULTS | % | [ ] | [ ] |
| HAZE COPOLYESTER A | % | 25.7 | 15 |
| HAZE COPOLYESTER C | % | 104.2 | 103.6 |

Comparative Example 2

A 50 micron thick coating of each of the following coatings was applied to Copolyester A and Copolyester C. Comparative Coating B consisted of: 95% of Tripropylene Glycol Diacrylate (Sartomer SR508) and 5% 1-Hydroxycyclohexyl Phenyl Ketone (Irgacure™ 284). Using equation 1, the average molecular weight between crosslinks was calculated to be 203.4 g/mole. Comparative Coating C consisted of: 95% Aliphatic Urethane Diacrylate (Cytec Ebercyl 284) and 5% 1-Hydroxycyclohexyl Phenyl Ketone (Irgacure™ 284). Ebercyl is an aliphatic urethane diacrylate of 1200 g/mole molecular weight diluted to 10 weight % with 1,6-hexanediol diacrylate. Using equation 1, the average molecular weight between crosslinks was calculated to be 231.6 g/mole. Comparative Coating A was also used. These coated plaques were exposed to the same essential oil solutions as in Example 2 for 3 weeks at 45° C. The haze values after the exposures are listed in Comparative Table 2. All three comparative coatings were less effective in reducing the amount of haze induced by exposure to essential oils.

COMPARATIVE TABLE 2

| ESSENTIAL OIL | UNITS | BENZYL ACETATE | PHENETHYL ACETATE |
|---|---|---|---|
| COMPARATIVE COATING A | | | |
| HAZE POLYESTER A | % | 16.5 | 22.5 |
| HAZE POLYESTER C | % | 78.7 | 52.2 |
| COMPARATIVE COATING B | | | |
| HAZE COPOLYESTER A | % | 23.5 | 16.0 |
| HAZE COPOLYESTER C | % | 104.0 | 103.8 |

COMPARATIVE TABLE 2-continued

| ESSENTIAL OIL | UNITS | BENZYL ACETATE | PHENETHYL ACETATE |
|---|---|---|---|
| COMPARATIVE COATING C | | | |
| HAZE COPOLYESTER A | % | 24.6 | 11.2 |
| HAZE COPOLYESTER C | % | 104.0 | 104.2 |

Example 3

A 20 micron thick coating was applied to Copolyester A and Copolyester C. Coating B consisted of 42.75% of tricyclodecane dimethanol diacrylate (Sartomer SR-833), 52.25% of dipentaerythritol penta-acrylate (Sartomer SR-399), and 5% Irgacure 184 (1-hydroxycyclohexyl benzophenone). Using equation 1, the average molecular weight between crosslinks was calculated to be 176.3 g/mole. Coating C consisted of 38.0% of the Sartomer SR-833, 57.0% of pentaerythritol tetraacrylate (Sartomer SR-295), and 5% Irgacure 184. Using equation 1, the average molecular weight between crosslinks was calculated to be 155.5 g/mole. The coated plaques were exposed to 33% of the following essential oils in ethanol: cis-3-hexenyl salicylate and veratraldehyde. The exposure period was 8 weeks at 50° C. The haze values are listed in Table 3.

TABLE 3

| ESSENTIAL OIL | UNITS | cis-3-HEXENYL SALICYLATE | VERATRALDEHYDE |
|---|---|---|---|
| COATING B | | | |
| HAZE POLYESTER A | % | −1.8 | −1.8 |
| HAZE POLYESTER C | % | 0.2 | −1.6 |
| COATING C | | | |
| HAZE POLYESTER A | % | −1.8 | −1.9 |
| HAZE POLYESTER C | % | −0.7 | −0.6 |
| COMPARATIVE COATING D | | | |
| HAZE POLYESTER A | % | 34.7 | 34.1 |
| HAZE POLYESTER C | % | 7.5 | 14.0 |

Comparative Example 3

A 20 micron thick coating was applied to Copolyester A and Copolyester C. Comparative Coating D consisted of: 42.75% of the Sartomer SR-833, 52.25% of pentaerythritol triacrylate (Sartomer SR-444), and 5% Irgacure 184. Using equation 1, the average molecular weight between crosslinks was calculated to be 193.4 g/mole. The haze values after the same chemical exposure as Example 3 are also listed in Table 3. It is clear that the exposure induced significantly more haze in the plaques coated with Comparative Coating D than for the plaques coated with Coating B or Coating C.

Example 4

A 36 micron thick coating was applied to Copolyester B. Coatings B and C were again used. The coated plaques were exposed to 33% of the following essential oils in ethanol: benzyl acetate, methyl 2-octynoate, and veratraldehyde. The exposure period was 8 weeks at 50° C. The haze values are listed in Table 4.

Comparative Example 4

A 36 micron thick coating was applied to Copolyester B. Comparative Coating D was again used. The haze values after the same chemical exposure as Example 4 are also listed in Table 4. It is clear that the exposure induced significantly more haze in the plaques coated with Comparative Coating D than for the plaques coated with Coating B or Coating C.

TABLE 4

| ESSENTIAL OIL | UNITS | BENZYL ACETATE | METHYL 2-OCTYNOATE | VERATRALDEHYDE |
|---|---|---|---|---|
| COATING B | | | | |
| HAZE POLYESTER B | % | 2.9 | 0.7 | −0.8 |
| COATING C | | | | |
| HAZE POLYESTER B | % | 1.8 | 0.1 | 0.1 |
| COMPARATIVE COATING D | | | | |
| HAZE POLYESTER B | % | 6.3 | 4.6 | 5.1 |

Example 5

A 25.4 to 50.8 micron thick coating was applied to Copolyester A. Coating E consisted of 40.5% of tricyclodecane dimethanol diacrylate (Sartomer SR-833), 55.5% of dipentaerythritol penta-acrylate (Sartomer SR-399), 3% Irgacure 819 (bis(2,4,6-trimethylbenzoyl)-phenylphosphine oxide) and 1% of Esacure One from Sartomer. Using equation 1, the average molecular weight between crosslinks was calculated to be 176.3 g/mole. The Coating E solution was warmed to 50° C. and about 10 ml was transferred into a 100 ml plastic bottle that was fabricated from an amorphous Copolyester A marketed by Eastman Chemical Company. After wetting the entire inside of the plastic bottle, the excess coating was allowed to drain and a thin film of monomer remained. The thickness of the bottle side wall was about 1/16 inches.

The thin monomer film was cured through the walls of the bottle using a UV cabinet fitted with a V-bulb having the following energy readings:

|       | Joules | Watts |
|-------|--------|-------|
| $UV_A$ | 5.1 | 2.1 |
| $UV_B$ | 1.9 | 0.8 |
| $UV_C$ | 0.1 | 0.04 |
| $UV_V$ | 11.3 | 4.7 |

After a total exposure of 2.5 minutes, a 0.5-1.0 mil essentially colorless film was obtained. The bottle was coated 2× using the above procedure for a total film thickness between 1-2 mil. A solution of 30 weight % limonene in ethanol was charged to the bottle that was capped to prevent evaporative loss. Along with an uncoated control, the bottle was placed in a 50° C. oven and monitored for chemical attack of the plastic. After one day, the uncoated bottle was completely hazy. The coated bottle remained clear for 8 weeks and the test was terminated without any visible sign of degradation to the plastic.

Example 6

A monomer blend containing 40.5 wt % Sartomer SR 833, 55.5 wt % Sartomer SR 399, 3 wt % Irgacure 819 and 1 wt % Esacure One was stirred at 50° C. for 2 hours until all of the initiators were dissolved to form a clear, yellow coating formulation. After cooling the blend to room temperature, a drawdown rod was used to apply a 2-mil coating to 4-inch× 4-inch×⅛-inch polyester plaques that were obtained by injection molding of Eastman Tritan™ TX1000 Copolyester. A Fusion UV Systems HP-6/VPS-3 curing station with a model LC-6 conveyor system running at 5 ft/minute was equipped with a V-bulb, 2 inches above the belt, to cure the plaques. The irradiance dosage was measured using an EIT Power Puck® radiometer where the 2 pass readings were recorded as:

| UV Range | Joules | Watts |
|----------|--------|-------|
| $UV_A$ | 5.1 | 2.1 |
| $UV_B$ | 1.9 | 0.8 |
| $UV_C$ | 0.1 | 0.05 |
| $UV_V$ | 11.3 | 4.7 |

A coated plaque was direct cured and after 2 passes a hard coating was obtained that was judged to be fully cured when tested by a stainless steel probe. A second coated plaque was placed face down in a support to allow for indirect cure and after 8 passes a hard coating was obtained with hardness similar to the direct cure test piece. The actual time of exposure to V-bulb UV light was around 90 seconds.

Example 7

The same coating formulation and apparatus described in Example 6 were used. A 50 ml Tritan™ TX1001 copolyester bottle, approximately cylindrical in shape, was filled with the coating formulation that was pre-heated to 50° C. After draining the excess coating, the bottle was inverted and pre-cured overnight in fluorescent room light before the process was repeated the next day to apply a second coating. The bottle was passed through the UV cabinet at a belt speed of 5 ft/minute 8 times to provide a cured film that was measured by microscopy to have a thickness between 1 and 2-mils. Chemical resistance testing was accomplished by filling the bottle approximately half full with a 30 wt % limonene solution in ethanol. The bottle was stored in an oven at 50° C. and checked for haze versus an uncoated control. After 4 weeks at 50° C. the bottle was removed from the oven, emptied and no haze was observed.

Example 8

The same apparatus described in Example 6 was used. A monomer blend of 40.5 wt % Sartomer SR 833, 55.5 wt % Sartomer™ SR 399LV, 3 wt % benzoyl peroxide and 1 wt % Irgacure 819 photoinitiator was stirred at 50° C. for 2 hours until all of the initiators were dissolved to form a clear, yellow coating formulation. The coating was a lighter yellow color than the formulation in Example 6 and was applied by drawdown to a film thickness of 2-mil on a Tritan™ TX1000 Copolyester plaque as described previously. The plaque was cured by 8 passes through the UV apparatus followed by thermal curing at 90° C. for 60 minutes to obtain a clear, hard film.

Example 9

A monomer blend containing 39 wt % Sartomer™ SR 833, 54 wt % Sartomer™ SR 399, 3 wt % Irgacure 184 and 2 wt % Esacure™ One (available from Lamberti S.p.A. Corporation, Italy) was stirred at 50° C. for 2 hours until all of the initiators were dissolved to form a clear, colorless coating solution. After cooling the coating solution to room temperature, a drawdown rod was used to apply a 2-mil coating to 4-inch×4-inch×⅛-inch polyester plaques that were obtained by injection molding of Eastman Tritan™ TX1000 Copolyester. A Fusion UV Systems HP-6/VPS-3 curing station with a model LC-6 conveyor system running at 5 ft/minute was equipped with a H-bulb, 2 inches above the belt, to cure the plaques. The irradiance dosage was measured using an EIT Power Puck® radiometer where the 2 pass readings were recorded as:

| UV Range | Joules | Watts |
|----------|--------|-------|
| $UV_A$ | 6.9 | 2.6 |
| $UV_B$ | 4.3 | 2.2 |
| $UV_C$ | 0.7 | 0.4 |
| $UV_V$ | 5.2 | 3.9 |

The plaque was placed face down in the support and after 10 passes through the UV apparatus, a clear, hard coating was obtained with only slight yellowing of the plastic.

Example 10

The apparatus and formulation described in Example 9 were used. A support was fabricated where the test piece could be placed ⅛" below an opaque cover having a 1.5-inch hole in the center to allow for direct UV exposure to only that portion of the coated plaque. The assembly was passed through the UV cabinet at a belt speed of 10 ft/minute 2 times to fully cure the center area and an additional +¼-inch boundary area that was not directly exposed to UV light. An additional two passes (4 total) through the UV cabinet expanded the frontal cure boundary to +½-inches.

Example 11 (Comparative)

The same apparatus described in Example 6 was used. A monomer blend of 41 wt % Sartomer SR 833, 56 wt % Sartomer SR 399LV and 3 wt % benzoyl peroxide was stirred at 50° C. for 2 hours until all of the initiator was dissolved to form a clear, colorless coating solution. The clear, colorless coating was applied by drawdown to a film thickness of 2-mil on a Tritan™ TX1000 Copolyester plaque as described previously. The plaque was cured heating at 90° C. for 3 hours to obtain a clear, hard, colorless film. Shorter cure times resulted in films having inadequate cure when tested by drawing a stainless steel probe across the coating surface and whitening was observed.

In the specification, there have been disclosed typical preferred embodiments of the invention and, although specific terms are employed, they are used in a generic and descriptive sense only and not for purposes of limitation, the scope of the invention being set forth in the following claims.

We claim:

1. An article comprising a thermoplastic polymer and a coating on a surface of the polymer, the coating comprising:
   a) about 30 to about 70 weight % of a diacrylate of an aliphatic diol, selected from the group consisting of hexanediol diacrylate, tricyclodecanedimethanol diacrylate and mixtures thereof;
   b) about 30 to about 70 weight % of a polyacrylate of an aliphatic polyol, wherein the polyacrylate comprises a triacrylate of an aliphatic triol or a tetraacrylate of an aliphatic tetraol or a penta-acrylate of an aliphatic pentaol; and
   c) about 0.1 to about 15 weight % of a photoinitiator, selected from the group consisting of benzophenone, 1-hydroxy-cyclohexylphenyl-ketone, methylbenzoylformate, alpha, alpha-diethoxy-alpha phenylacetophenone, 1-hydroxycyclohexyl benzophenone, and diphenyl(2,4,6-trimethylbenozyl)phosphine oxide and mixtures thereof; and
   d) optionally, a thermal free-radical initiator,
   wherein the weight % is based on the total weight of the coating;
   wherein the average molecular weight between crosslinks in the coating is less than 190 g/mol;
   wherein the polymer has a solubility parameter ranging from about 9.4 to about 14.0 $(cal/cm^3)^{0.5}$;
   wherein the polymer is a polyester; and
   wherein the polyester comprises:
   a) a diacid component comprising:
      from 60 to 100 mole % terephthalic acid residues, and
      from 0 to 40 mole % of modifying diacid residues; and
   b) a glycol component comprising:
      from 30 to 100 mole % CHDM residues,
      from 0 to 70 mole % ethylene glycol residues, and
      from 0 to 50 mole % of modifying glycol residues; and
   wherein the haze value of the article after exposure to 33 weight % of 2-sec-butylcyclohexanone or phenethyl acetate in ethanol for four weeks at 50° C. is less than 15% as measured according to ASTM D1003.

2. An article comprising a thermoplastic polymer and a coating on a surface of the polymer, the coating comprising:
   a) about 30 to about 70 weight % of a diacrylate of an aliphatic diol; wherein the aliphatic diol comprises from 2 to 20 carbon atoms
   b) about 30 to about 70 weight % of a polyacrylate of an aliphatic polyol; wherein the aliphatic polyol comprises from 3 to 20 carbon atoms
   c) about 0.1 to about 15 weight % of a photoinitiator, selected from the group consisting of benzophenone, 1-hydroxy-cyclohexylphenyl-ketone, methylbenzoylformate, alpha, alpha-diethoxy-alpha phenylacetophenone, 1-hydroxycyclohexyl benzophenone, and diphenyl(2,4,6-trimethylbenozyl)phosphine oxide and mixtures thereof; and
   d) optionally, a thermal free-radical initiator,
   wherein the weight % is based on the total weight of the coating;
   wherein the average molecular weight between crosslinks in the coating is less than 190 g/mol;
   wherein the polymer has a solubility parameter ranging from about 9.4 to about 14.0 $(cal/cm^3)^{0.5}$;
   wherein the polymer is a polyester; and
   wherein the polyester comprises:
   a) a diacid component comprising:
      from 60 to 100 mole % terephthalic acid residues, and
      from 0 to 40 mole % of modifying diacid residues; and
   b) a glycol component comprising:
      from 30 to 100 mole % CHDM residues,
      from 0 to 70 mole % ethylene glycol residues, and
      from 0 to 50 mole % of modifying glycol residues; and
   wherein the haze value of the article after exposure to 33 weight % of 2-sec-butylcyclohexanone or phenethyl acetate in ethanol for four weeks at 50° C. is less than 15% as measured according to ASTM D1003.

3. An article comprising a thermoplastic polymer and a coating on a surface of the polymer, the coating comprising:
   a) about 30 to about 70 weight % of a diacrylate of an aliphatic diol, selected from the group consisting of hexanediol diacrylate, tricyclodecanedimethanol diacrylate and mixtures thereof;
   b) about 30 to about 70 weight % of a polyacrylate of an aliphatic polyol, selected from the group consisting of trimethylol propane triacrylate, dipentaerythritol pentaacrylate, pentaerythritol tetraacrylate, pentaerythritol triacrylate and mixtures thereof;
   c) about 0.1 to about 15 weight % of a photoinitiator, selected from the group consisting of benzophenone, 1-hydroxy-cyclohexylphenyl-ketone, methylbenzoylformate, alpha, alpha-diethoxy-alpha phenylacetophenone, 1-hydroxycyclohexyl benzophenone, and diphenyl(2,4,6-trimethylbenozyl)phosphine oxide and mixtures thereof; and
   d) optionally, a thermal free-radical initiator,
   wherein the weight % is based on the total weight of the coating;
   wherein the average molecular weight between crosslinks in the coating is less than 190 g/mol;

wherein the polymer has a solubility parameter ranging from about 9.4 to about 14.0 $(cal/cm^3)^{0.5}$;
wherein the polymer is a polyester; and
wherein the polyester comprises:
a) a diacid component comprising:
   from 60 to 100 mole % terephthalic acid residues, and
   from 0 to 40 mole % of modifying diacid residues; and
b) a glycol component comprising:
   from 30 to 100 mole % CHDM residues,
   from 0 to 70 mole % ethylene glycol residues, and
   from 0 to 50 mole % of modifying glycol residues; and
wherein the haze value of the article after exposure to 33 weight % of 2-sec-butylcyclohexanone or phenethyl acetate in ethanol for four weeks at 50° C. is less than 15% as measured according to ASTM D1003.

4. The article according to claim 1, 2 or 3, wherein the average molecular weight between cross-links is from 100 g/mol to less than 190 g/mol.

5. The article according to claim 1, 2 or 3, wherein the polyester further comprises a branching agent.

6. The article according to claim 1, 2 or 3, wherein the polyester comprises at least one recycled monomer that has been recovered by depolymerization of scrap or post-consumer polyesters, wherein the recycled monomer is selected from the group consisting of DMT, dimethyl isophthalate, ethylene glycol, 1,4-CHDA, 1,4-CHDM, 1,4-CHDA prepared from recycled DMT and 1,4-CHDM prepared from recycled DMT.

7. The article according to claim 1, 2 or 3, wherein the coating is applied by spraying, dipping or brushing.

* * * * *